United States Patent [19]

Fetcenko

[11] Patent Number: 5,002,730
[45] Date of Patent: Mar. 26, 1991

[54] PREPARATION OF VANADIUM RICH HYDROGEN STORAGE ALLOY MATERIALS

[75] Inventor: Michael A. Fetcenko, Royal Oak, Mich.

[73] Assignee: Energy Conversion Devices, Troy, Mich.

[21] Appl. No.: 383,693

[22] Filed: Jul. 24, 1989

[51] Int. Cl.$^5$ .......................... C01B 6/00; H01N 4/00
[52] U.S. Cl. ..................... 420/424; 75/959; 420/580; 420/590; 420/900
[58] Field of Search ............... 420/424, 590, 580, 900; 75/27, 65 EB

[56] References Cited

U.S. PATENT DOCUMENTS

| | | | |
|---|---|---|---|
| 3,625,676 | 12/1971 | Perfect | 75/134 V |
| 4,610,720 | 9/1986 | Schmidt et al. | 75/84 |
| 4,684,506 | 11/1986 | Hahn et al. | 425/552 |

FOREIGN PATENT DOCUMENTS 1145147 4/1983 Canada .
1074043 6/1967 United Kingdom .

OTHER PUBLICATIONS

CA 73:122611j, Bose, Aluminothermic Reduction of Vanadium Pentoxide, Trans. Ind. Inst. Metals (1970), 23(1), pp. 56–59.
CA 77:37710X, Open Aluminothermic Reduction of Vanadium Oxides, J. Less Common Metals (1972), 27(2), pp. 251–254.
CA 80:98615d, Relation of Rate and Characteristics of Aluminothermal Processes to temperature and pressure, Metalloterm Protsessy Khim. Met. Mater. Konf, 1971, pp. 145–151.
CA 88:156362x, On Aluminothermic Reduction of Calcium Vanadate, Metall. Trans. B, 1977, 8B(4), pp. 683–685.
CA 96:38776C, Preparation of High Purity Vanadium, Extr. Metall. Refract. Met. Proc. Symp., 1981, pp. 191–203.
CA 98:183164w, Ferrovanadium from a Secondary Source of Vanadium, Metall. Trans. B., 1953, 14B(1), pp. 131–135.
CA 99:108548t, Smelting of Ferrovanadium by the Aluminothermic Method, Izv. Vyssh. Uchebn. Zaved. Chern. Metall., 1983(3), pp. 39–43.
CA 100:78435m, Aluminothermic Reduction of Vanadium Pentoxide, Arch. Hutn., 1983, 28(3), pp. 341–349.
CA 104:133464s, Industrial Experience with Aluminothermic Ferrovanadium Manufacture, Banyasz. Kohasz. Lapok, Kohasz., 1985, 118(9), pp. 382–388.

Primary Examiner—Upendra Roy

[57] ABSTRACT

Disclosed is a method of forming a vanadium-rich, multi-component reversible, electrochemical hydrogen storage alloy directly from a vanadium-reductant alloy without first obtaining pure vanadium. In one exemplification the vanadium-reductant alloy is a vanadium-aluminum alloy of low oxygen content, while in another exemplification the vanadium-reductant alloy is refined by electron beam evaporation, and in a third exemplification the vanadium-reductant alloy contains further reductants that reduce the oxygen content without adding impurities to the alloy. The vanadium-reductant alloy is directly used as a precursor in forming the electrochemical hydrogen storage alloy.

40 Claims, 1 Drawing Sheet

PREPARATION OF VANADIUM RICH HYDROGEN STORAGE ALLOY MATERIALS

FIELD OF THE INVENTION

The present invention relates generally to economical routes to vanadium alloys for the manufacture of vanadium based hydrogen storage alloy materials. In a preferred exemplification the vanadium based hydrogen storage alloys are intended for use in rechargeable electrochemical cells. More particularly, the present invention relates to a low cost method for the preparation of the vanadium, or other refractory forming metals (as hafnium, zirconium, and niobium) that is compatible with the intended use of the metal as a component of a highly alloyed, chemically stable, metal hydride, hydrogen storage alloy material. The method of the invention avoids the expensive preparation of pure metallic material, as metallic vanadium, and goes from the oxide, as vanadium oxide, through a compatible precursor or intermediate to a hydrogen storage alloy without first obtaining or requiring high purity metal, as high purity vanadium, hafnium, zirconium, or niobium.

BACKGROUND OF THE INVENTION

A new class of secondary cells, i.e., batteries, are metal hydride secondary cells. These cells eliminate the toxic cadmium negative electrodes of conventional nickel-cadmium cells, substituting therefor a metal hydride negative electrode. Most of the research activity in this field has involved the lanthanum penta-nickel alloy system, the titanium-nickel alloy system, and the iron-titanium alloy system. These alloy systems all suffer from various deficiencies, e.g., low storage capacity, poor thermodynamics, or poor kinetics.

One hydrogen storage alloy system that overcomes these disadvantages is the titanium-vanadium system of hydrogen storage alloys. This system is exemplified by the titanium-vanadium- nickel- zirconium and titanium-vanadium- nickel-zirconium- chromium systems of hydrogen storage alloys and when the term "titanium-vanadium" is used herein with respect to hydrogen storage alloys, such alloys also containing nickel, zirconium, chromium, aluminum, iron, and other additives are encompassed thereby unless the context indicates to the contrary.

Exemplary titanium-vanadium alloys include titanium-vanadium- nickel- aluminum alloys; titanium-vanadium- nickel-zirconium alloys; titanium- vanadium-chromium- nickel alloys; titanium- zirconium- vanadium- nickel- chromium alloys; and titanium- vanadium-manganese- iron alloys. The preferred titanium-vanadium type alloys are those having the stoichiometries:

(1). titanium- vanadium- nickel- aluminum alloys having the formula $(TiV_{2-x}Ni_x)_{1-y}Al_y$, where x is from 0.2 to 1.0, and y is from 0 to 0.2;

(2). titanium- vanadium- nickel- zirconium alloys having the formula $(TiV_{2-x}Ni_x)_{1-y}Zr_y$, where x is from 0.2 to 1.0, and y is from 0 to 0.2;

One hydrogen storage alloy system that overcomes these disadvantages is the titanium-vanadium system of hydrogen storage alloys. This system is exemplified by the titanium-vanadium- nickel- zirconium and titanium-vanadium- nickel-zirconium- chromium systems of hydrogen storage alloys and when the term "titanium-vanadium" is used herein with respect to hydrogen storage alloys, such alloys also containing nickel, zirconium, chromium, aluminum, iron, and other additives are encompassed thereby unless the context indicates to the contrary.

Exemplary titanium-vanadium alloys include titanium-vanadium- nickel- aluminum alloys; titanium-vanadium- nickel-zirconium alloys; titanium- vanadium-chromium- nickel alloys; titanium- zirconium- vanadium- nickel- chromium alloys; and titanium- vanadium-manganese- iron alloys. The preferred titanium-vanadium type alloys are those having the stoichiometries:

(1). titanium- vanadium- nickel- aluminum alloys having the formula $(TiV_{2-x}Ni_x)_{1-y}Al_y$, where x is from 0.2 to 1.0, and y is from 0 to 0.2;

(2). titanium- vanadium- nickel- zirconium alloys having the formula $(TiV_{2-x}Ni_x)_{1-y}Zr_y$, where x is from 0.2 to 1.0, and y is from 0 to 0.2; herein by reference. One particularly preferred class of these of these alloys is described with particularity in U.S. Pat. No. 4,728,586 for *Enhanced Charge Retention Electrochemical Hydrogen Storage Alloys And An Enhanced Charge Retention Electrochemical Cell*, above, and has the formula $(Ti_{2-x}Zr_xV_{4-y}Ni_y)_{1-z}Cr_z$, where x is from 0.00 to 1.50, y is from 0.6 to 3.5, and z is an effective amount less then 0.20. The titanium-vanadium hydrogen storage alloys described in the above cited patents typically contain at least about 20 atomic percent vanadium, and sometimes as high as 53 percent vanadium, atomic basis. This high vanadium content is identified with very good thermodynamics, kinetics, and corrosion resistance.

While titanium-vanadium alloys have highly desirable chemical, thermodynamic, and microstructural properties for hydrogen storage, especially electrochemical hydrogen storage, they have not received the research, development, or commercial attention commensurate with their outstanding properties. This is because vanadium alloys have historically been expensive alloys, treated with the commercial respect given precious metal alloys. Indeed, research efforts in the field of electrochemical hydrogen storage alloys have traditionally avoided vanadium alloys due to the high costs associated with the vanadium constituent thereof. Thus, if the highly desirable properties associated with vanadium containing hydrogen storage alloys are to be realized, a need clearly exists for a low cost route to these vanadium rich hydrogen storage alloys.

A major factor contributing to the expense of these alloys is the high cost associated with obtaining metallic vanadium having what has heretofore been considered the requisite purity for incorporation into electrochemical hydrogen storage alloys. This high recovery cost is due to the chemical stability of the refractory vanadium oxide. Processes that work for other refractory oxides do not work with vanadium oxide. For example, the Kroll process is used to recover titanium and zirconium via the reaction system $TiO_2 + 2\ Cl_2 = TiCl_4$, $TiCl_4 + 2\ Mg = Ti + 2\ MgCl_2$. This process fails with vanadium, yielding only a lower valence vanadium oxychloride upon magnesium reduction. This lower valence vanadium material is unsuitable for subsequent formation into an electrochemical hydrogen storage alloy.

Likewise, aluminothermic reduction requires a substantial excess of aluminum to completely reduce the vanadium oxide and recover metallic vanadium. Moreover, the use of excess aluminum results in a vanadium-aluminum alloy product containing a substantial amount of metallic aluminum alloyed with the vanadium, typically fifteen percent aluminum (by weight). Aluminum presence to this degree is generally too high to be of use in the preparation of hydrogen storage alloys. Note however, that U.S. Pat. No. 4,551,400 for *Hydrogen Storage Materials And Method Of Sizing And The Same For Electrochemical Applications*, above, specifically discloses electrochemical hydrogen storage alloys having the formula $(TiV_{2-x}Ni_x)_{1-y}Al_y$, where x is from 0.0 to 1.0, and y is from 0.0 to 0.2, the maximum atomic ratio of V to Al is 80:20, and the maximum weight ratio of V to Al is 88:12. While this is below the 85:15 of the commercially available V-Al alloys, it is still high.

Thus, vanadium based electrochemical hydrogen storage alloys have heretofore been commercially limited by the cost of recovering high purity vanadium.

SUMMARY OF THE INVENTION

The invention described herein provides an economical pathway to vanadium containing hydrogen storage alloys by utilizing a vanadium-reductant alloy, e.g., a vanadium-aluminum alloy, or a vanadium-nickel-aluminum alloy, as the intermediate. The method of the invention bypasses the direct recovery of metallic vanadium and the high costs associated therewith.

In one embodiment of the method of the invention the reductant is primarily aluminum, and the aluminum content in the melt is high enough to reduce the vanadium oxide to alloyed metallic vanadium. In this regard, it is well known in the metallurgical field that the concentrations of oxygen and aluminum in aluminothermically reduced vanadium are approximately inversely proportional. Thus, as is well known in the art, a very high concentration of aluminum is required in order to provide a sufficiently oxygen free vanadium for alloying with titanium in a titanium- vanadium- aluminum super alloy. However, it has not heretofore been recognized in the field of hydrogen storage alloys, e.g., electrochemical hydrogen storage alloys, that this inverse relationship of aluminum and oxygen in vanadium can be controlled specifically for forming hydrogen storage metal hydride alloys, e.g., electrochemical hydrogen storage metal hydride alloys. Specifically, in the absence of other reductants, the aluminum content can be reduced to as low as about seven weight percent, while still maintaining the oxygen content low enough for electrochemical hydrogen storage applications. The 93-7 alloy has a low enough oxygen content to avoid poisoning the final alloy product, and a ratio of vanadium to total vanadium and aluminum that is consistent with reversible hydrogen storage, e.g., electrochemical hydrogen storage. As demonstrated in our commonly assigned, copending, U.S. patent application, Ser. No. 382,599, filed concurrently herewith on July 21, 1989, of Michael A. Fetcenko, Steven P. Sumner, and Joseph LaRocca, for ALLOY PREPARATION OF HYDROGEN STORAGE MATERIALS, incorporated herein by reference, these hydrogen storage alloys may be partially refined, with some oxygen removal, during melting. Thus, slightly higher than normally allowable oxygen concentrations can be tolerated in the raw materials, whilestill maintaining low oxygen concentrations in the final alloy. Moreover, this alloy can be directly used in compositions having vanadium/titanium ratios such as those described in U.S. Pat. Nos. 4,551,400, 4,716,088, and 4,728,586, all previously incorporated herein by reference.

According to another exemplification of the invention, it has been found that additives to standard aluminothermic reduction melts reduce the amount of excess aluminum required, so that the oxygen is removed to a high degree with only a small amount of aluminum metal contained in the alloy. The resulting alloy is low enough in oxygen and of proper reductant contents to be directly utilized, without further treatment, for forming vanadium-rich, multi-component, multi-phase, reversible hydrogen storage alloys, e.g., vanadium-rich, multi-component, multi-phase, reversible, electrochemical hydrogen storage alloys. According to this exemplification of the method of the invention, reduction of vanadium oxide to high purity metallic vanadium is avoided by forming a first melt of vanadium oxide, aluminum, and a second reductant, which in a preferred embodiment is nickel, and utilizing the aluminothermically reduced product of the first melt, including aluminum and, for example, nickel, as a precursor for the multi-component, multi-phase electrochemical hydrogen storage alloy.

In this preferred exemplification where two reductants, for example, aluminum and nickel, are used the melt has a high enough concentration of aluminum to aluminumothermically reduce the vanadium oxide, and a high enough nickel content to both (1) lower the excess of aluminum required in the melt for a given degree of reduction of the vanadium, and (2) to phase separate the aluminum oxide formed thereby from the molten metallic phase. Thus, the nickel and aluminum contents in the molten first melt are at a level to reduce the vanadium to an acceptable oxygen level in the vanadium rich phase and control the residual aluminum level therein.

In another exemplification of the invention, high aluminum content alloys, as 85:15 alloys, and even 93:7 alloys may be further reduced in aluminum content by electron beam distillation. In the molten state, the vapor pressure of aluminum is substantially higher then that of vanadium. Consequently, it is possible to refine the vanadium-aluminum alloy to very low aluminum contents by selectively boiling off or distilling the aluminum. For example, an 85-15 V-Al alloy can be distilled to an 93-7 V-Al alloy, or to a 99-1 V-Al alloy of very low oxygen content, while a 93-7 V-Al alloy can be distilled to a 99-1 V-Al alloy. Electron beam evaporation, also referred to herein as electron beam distillation, provides an economical process for converting a high aluminum V-Al alloy, e.g., an alloy containing in excess of seven weight percent aluminum, to a low aluminum V-Al alloy, e.g., an alloy containing less then seven weight percent aluminum, for use as a component of an electrochemical hydrogen storage alloy.

The vanadium-reductant alloys, for example, electron beam refined V-Al alloy, vanadium-aluminum alloys direct from an aluminothermic refining process, e.g., 93/7 V-Al alloys, or vanadium-nickel-aluminum alloys containing less then one weight percent Al, e.g., 65/35/minor V-Ni-Al alloys, are used as the feed to a series of subsequent steps. In these subsequent steps the alloy is alloyed with, for example, zirconium, titanium, chromium, iron, manganese, and the like. The vanadium-reductant alloy, now alloyed with one or more of zirconium, titanium, chromium, iron, managnese, and the like, is useful as a reversible hydrogen storage alloy, for example, the negative electrode material of rechargeable electrochemical metal hydride hydrogen storage cells.

The specific steps involved in fabricating the highly alloyed metal hydride hydrogen storage material into an electrode include: (1) forming a vanadium-reductant alloy, e.g., an aluminothermic vanadium-aluminum alloy, optionally with subsequent electron beam refining, or a vanadium-nickel-aluminum alloy, from vanadium oxide, with aluminum, or aluminum and nickel and/or iron; (2) providing an electrochemically operative amount of the vanadium-reductant alloy, (3) adding thereto electrochemically operative amounts of nickel and other alloying agents, for example, chromium, titanium, zirconium, nickel, and/or iron, while maintaining the molten alloy at a temperature of at least about 1700° Centigrade; (4) solidifying the alloy; (5) comminuting the alloy to form fine particles thereof having a size less then 200 mesh; and (6) bonding these fine particles to a suitable, electroconductive current collector substrate.

THE FIGURE

FIG. 1 is a flow chart of an integrated process of one embodiment of the invention, including aluminothermic reduction of the vanadium by the reductant metals to form a vanadium-reductant alloy and a slag, and the use of the vanadium-reductant alloy as the feed to the hydrogen storage alloy synthesis reactor. The FIGURE shows a two step, hydride-dehydride size reduction followed by impact milling size reduction of the alloy, and the fabrication of a negative electrode.

DETAILED DESCRIPTION OF THE INVENTION

Figure 1:
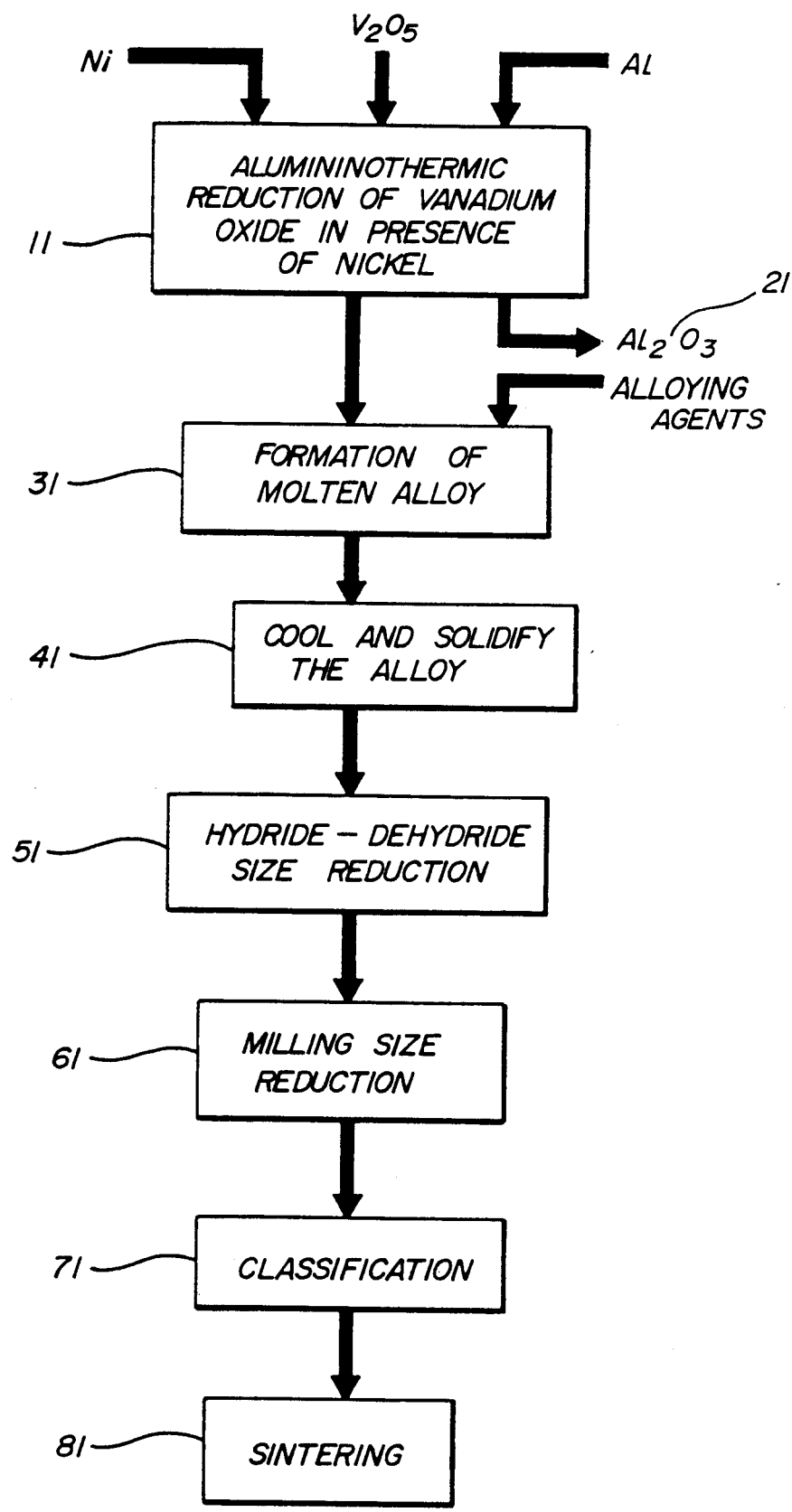

According to the invention described herein there is provided a low cost route to hydrogen storage alloys that are rich in refractory forming metallic components, as vanadium, hafnium, zirconium, and niobium, and especially vanadium rich electrochemical hydrogen storage alloys. Vanadium rich hydrogen storage alloys generally contain one or more of nickel, titanium, zirconium, chromium, manganese, iron, and aluminum, and most commonly titanium, and one or more of nickel, zirconium, chromium, manganese, iron, and aluminum. These alloys may be used as chemical hydrogen storage alloys, catalysts, and thermal hydrogen storage alloys, and they are particularly useful as hydrogen storage negative electrodes in reversible electrochemical cells, i.e., secondary cells. Vanadium plays a critical role in determining the superior performance of the materials. Unfortunately, the vanadium, to a large extent, determines the cost of the alloy. Moreover, the vanadium content of the alloy can only be reduced at a high cost in reduced reversible, electrochemical hydrogen storage capability, e.g., rate and capacity. It is necessary to maintain a balance between the cost of the hydrogen storage alloy and the performance parameters of the hydrogen storage alloy. This balance has heretofore been dominated by the high cost of pure vanadium.

The commercially available, low cost, vanadium alloys, as ferrovanadium and $V_{85}Al_{15}$, are electrochemically incompatible with many alloys intended for reversible hydrogen storage, especially, reversible electrochemical hydrogen storage. Thus, it has heretofore been necessary to utilize high cost, high purity vanadium in the fabrication of vanadium rich hydrogen storage alloys.

One impurity that is poisonous to hydrogen storage alloys is oxygen. Oxygen reduces the availability of hydrogen storage sites in the hydrogen storage alloy and significantly reduces the catalytic activity of the hydrogen storage alloy. The onset of poisoning sets a limit on the oxygen content of the alloy. Moreover, when aluminothermic reduction is utilized the amount of oxygen is inversely related to the excess of aluminum utilized in aluminothermic reduction of the vanadium, while the aluminum content of the resulting vanadium is directly related to the excess amount of aluminum utilized. As greater excesses of aluminum are utilized for aluminothermic reduction, the concentration of oxygen in the vanadium-aluminum alloy product decreases, and the amount of aluminum therein increases. For example, vanadium-aluminum binary alloys containing about 7 percent aluminum contain about 0.5 percent oxygen. While this is more oxygen then would be found in the lowest commercially available V-Al alloys, $V_{85}$-$Al_{15}$ alloys, it is still, when diluted by other components of the hydrogen storage alloy, an acceptable oxygen content in the final electrochemical hydrogen storage alloy for electrochemical hydrogen storage. Moreover, as demonstrated in our commonly assigned, copending, U.S. patent application, Ser. No. 382,599, filed concurrently herewith on July 21, 1989, of Michael A. Fetcenko, Steven P. Sumner, and Joseph LaRocca, for ALLOY PREPARATION OF HYDROGEN STORAGE MATERIALS, incorporated herein by reference, these hydrogen storage alloys may be partially refined, with some oxygen removal, during melting.

While high aluminum contents are acceptable, and even beneficial in some specific hydrogen storage alloys, this is not always the case in electrochemical hydrogen storage alloys. For certain electrochemical applications and in some high vanadium hydrogen storage alloys, even seven percent aluminum can be too high. For these applications where even these low concentrations of aluminum can not be tolerated, it is possible by further alternative and additional exemplifications of the invention, to lower the aluminum concentration. This may be accomplished either during aluminothermic reduction by adding certain other reductants, as nickel, to the vanadium oxide-aluminum composition, or after aluminothermic reduction of the vanadium, by electron beam evaporation. Electron beam evaporation relies on the higher vapor pressure of aluminum relative to that of vanadium.

I. Aluminothermic Route to Hydrogen Storage Alloy

According to one exemplification of the invention a molten composition of about 93 weight percent vanadium (basis elemental vanadium) and about 7 weight percent aluminum (basis elemental aluminum) is prepared. This is a 7 percent excess of aluminum above the amount required to stoichiometrically reduce the vanadium, assuming

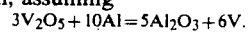
$3V_2O_5 + 10Al = 5Al_2O_3 + 6V.$

The aluminum aluminothermically reduces the vanadium, and the melt forms a two phase system. One phase is a metallic phase, i.e., a vanadium phase containing about 7 weight percent aluminum (elemental basis), and less then about 0.5 weight percent oxygen. The other phase is slag phase predominantly $Al_2O_3$. The vanadium-aluminum alloy is utilized, with other alloying elements, to form an electrochemical hydrogen storage alloy.

II. Electron Beam Evaporation of Aluminum from the Aluminothermic Reduction Product In an another exemplification of the invention, high aluminum content alloys, as V-Al 85:15 alloys, and even V-Al 93:7 alloys may be reduced in aluminum content by electron beam distillation. This is possible because in the molten state, the vapor pressure of aluminum is substantially higher then that of vanadium. Consequently, it is possible to refine the vanadium-aluminum alloys to very low aluminum contents by selectively boiling off or distilling the aluminum. For example, an 85-15 V-Al alloy can be distilled to an 93-7 V-Al alloy, or to a 99-1 V-Al alloy of very low oxygen content, while a 93-7 V-Al alloy can be distilled to a 99-1 V-Al alloy. Electron beam evaporation, also referred to herein as electron beam distillation, provides an economical process for converting a high aluminum V-Al alloy, e.g., an alloy containing in excess of 7 weight percent aluminum, to a low aluminum V-Al alloy, e.g., an alloy containing less then 7 weight percent aluminum, for use as a component of an electrochemical hydrogen storage alloy.

III. Alternate Aluminothermic Route to Hydrogen Storage Alloy

In a particularly preferred method of the invention, the flow chart of which is illustrated in the FIGURE, nickel is added to the composition of vanadium oxide and aluminum, thereby forming a molten composition of vanadium oxide, nickel, and aluminum,. This first step is represented by block 11 of the flow chart. The nickel addition appears to synergistically and, possibly catalytically, improve the yield of metallic vanadium per unit of aluminum, thereby reducing the necessary excess of aluminum. The presence of about 35 weight percent to about 60 weight percent nickel (basis total vanadium, aluminum, and nickel, all elemental basis) in the vanadium oxide-nickel-aluminum melt allows the aluminum content to be as low about 1 weight percent, or even as low as about 0.2 weight percent (basis total vanadium, aluminum, and nickel, all elemental basis) in the vanadium oxide-nickel-aluminum melt, with substantially complete reduction of the vanadium oxide to vanadium. In the presence of nickel, this small degree of excess aluminum still provides an oxygen content of as low as about 0.2 weight percent.

IV. Direct Use of Metallic Product

The vanadium-nickel alloy or vanadium-nickel-aluminum alloy, prepared as described above, is separated from the aluminum oxide slag. This is represented by block 21 of the FIGURE. The metallic product, separated from the slag, is utilized directly, either with or without electron beam evaporation, but without the added steps and expenses associated with recovering pure vanadium, as a principal ingredient to form electrochemical hydrogen storage alloys.

By utilizing the method of the invention, it is possible to avoid the expensive direct recovery of high purity metallic vanadium by utilizing the expedient of reductant elements, as aluminum, or reductant combinations, as aluminum and nickel, to obtain vanadium rich alloys. The vanadium rich alloys, as V-Al and V-Al-Ni, are directly alloyed with other metals to form vanadium containing, multi-component, multi-phase, reversible, electrochemical hydrogen storage alloys.

V. An Integrated Process for The Manufacture of Electrochemical Hydrogen Storage Alloys

A. Vanadium Oxide Reduction

The first step in forming a hydrogen storage alloy is the formation of a composition of vanadium oxide, and an excess of one or more reductants, as aluminum or aluminum and nickel, or aluminum and nickel and/or iron. This composition is heated, e.g., hot enough to initiate an aluminothermic reduction reaction between the vanadium oxide and the reductants, and to form a multi-phase melt, with one phase being a metallic phase of vanadium and reductant, e.g., a vanadium-reductant alloy, and the second phase being a slag phase, rich in oxide. This is represented by block 11 of the FIGURE.

The first melt is a composition of vanadium oxide, and aluminum, optionally with a second reductant, as nickel. The melt is heated hot enough to initiate an aluminothermic reduction reaction between the vanadium oxide and the aluminum. The aluminum reduces the vanadium oxide, liberating metallic vanadium and forming a slag second phase, rich in aluminum oxide. The slag phase is separated from the metal phase, as represented in block 21 of the FIGURE.

The metallic phase is substantially free of oxygen and has a controlled aluminum content. The oxygen content of the metallic phase is an inverse function of the aluminum content thereof, all other concentrations being held constant. The resulting metallic phase has a residual aluminum content resulting from the need for excess aluminum. However, when nickel is present, the nickel reduces the need for large excesses of aluminum, and consequent high aluminum contents in the metallic vanadium phase. This reduction in aluminum content occurs without increasing the oxygen content thereof. Thus, the nickel and aluminum contents in the molten first melt are at a level to reduce the oxygen content of the vanadium rich metallic phase to electrochemically tolerable levels, while also controlling the aluminum level therein. The vanadium-aluminum and vanadium-aluminum-nickel alloys are used as precursors for a series of subsequent steps where the vanadium alloy is alloyed with, for example, zirconium, titanium, chromium, iron, manganese, and the like.

According to an alternative exemplification of the invention an aluminothermic vanadium product, as 85-15 V-Al or 93-7 V-Al, can be refined and reduced in aluminum content by electron beam evaporation. When electron beam evaporation is utilized, the aluminothermic product is refined before forming the hydrogen storage alloy.

B. Formation of the Hydrogen Storage Alloy

The subsequent alloying, e.g., of the aluminothermic alloy or of the electron beam evaporation refined aluminothermic alloy is represented by block 31 of the FIGURE. Alloying is carried out by melting the vanadium alloy, i.e., the vanadium-aluminum alloy or the vanadium-aluminum-nickel alloy, with other alloying agents, e.g., zirconium, chromium, titanium, manganese, iron, and the like, in, e.g., a graphite crucible at a temperature of at least about 1500° C. The 1500° C. temperature provides a uniform melt of the molten hydrogen storage alloy material. One such process is more fully described in the commonly assigned, copending, U.S. Pat. application Ser. No. 382,599, filed July 21, 1989 of Michael A. Fetcenko, Steven P. Sumner, and Joe LaRocca, for ALLOY PREPARATION OF HYDROGEN STORAGE MATERIALS, incorporated herein by reference.

As described by Fetcenko, et al, the alloy is melted in a graphite crucible. The graphite crucible is operatively positioned inside a vacuum induction furnace so as to prevent exposure of the raw materials to air or other oxidizing agents. In order to further insure the absence of oxygen and other oxidants, the vacuum induction melting is carried out in an inert atmosphere, specifically in an atmosphere which is provided by gases selected from the group consisting of argon, neon, helium and combinations thereof. It is important to note that due to losses, i.e., leaks, vents, etc., which may occur in the gas recirculatory system of the apparatus employed in the method of melting the alloy, a supplemental supply of the non-reactive gas may be provided so as to maintain a substantially uniform flow of the non-reactive gas.

As described by Fetcenko et al, the molten hydrogen storage alloy material is poured or emptied from the high density, high purity graphite crucible into a water cooled graphite ingot mold, where it is allowed to cool, for example, for about approximately eight hours, solidifying into a highly alloyed vanadium alloy, with aluminum or aluminum and nickel, as well as one or more additional alloying agents, such as zirconium, chromium, titanium or the like, represented by block 41 of the FIGURE. This alloy is useful as the negative electrode of electrochemical hydrogen storage cells.

C. Fabrication of the Negative Electrode

The resulting material is then reduced in size, as represented by blocks 51 and 61 of the FIGURE. This is a multi-step process. The first step, represented by block 51 of the FIGURE, may be a hydride-dehydride process of the type described with particularity in commonly assigned, copending U.S. Pat. application Ser. No. 07/247,569, filed Sept. 22, 1988 now U.S. Pat. No. 4,893,756, in the names of Michael A. Fetcenko, Thomas Kaatz, Steven P. Sumner, and Joseph LaRocca, for HYDRIDE REACTOR APPARATUS FOR HYDROGEN COMMINUTION OF METAL HYDRIDE HYDROGEN STORAGE ALLOY MATERIAL, and incorporated herein by reference. In the described hydride-dehydride step, chunks of the hydrogen storage alloy material are reduced in size to form a particulate metal hydride, hydrogen storage alloy material.

While the particulate material is less than about 75 to 100 mesh size, even minus 100 mesh material is still too large for satisfactory performance as an electrochemical hydrogen storage material in a rechargeable secondary cell. Therefore a further size reduction step is necessary. The second size reduction step, represented by block 61 of the FIGURE, is a comminution step. In one comminution step a high speed impact mill is used to tangentially and radially accelerate the particulate metal hydride, hydrogen storage material against an impact block which is concentrically disposed therein. By this second comminution step the particulate metal hydride, hydrogen storage alloy material is comminuted along its natural fracture lines by the high speed impact mill. This is described in our commonly assigned, copending, U.S. patent application Ser. No. 07/308,289, filed Feb. 9, 1989, in the names of Merle Wolff, Mark A. Nuss, Michael A. Fetcenko, Andrea L. Lijoi, Steven P. Sumner, Joseph LaRocca, and Thomas Kaatz, for IMPROVED METHOD FOR THE CONTINUOUS FABRICATION OF COMMINUTED HYDROGEN STORAGE ALLOY MATERIAL NEGATIVE ELECTRODE, and incorporated herein by reference.

The high speed impact mill is preferably a center fed, high speed rotor mill adapted to turn at speeds between 5,000 and 20,000 rpm, and preferably at speeds of about 10,000 rpm. The selection of the appropriate speed for the rotor is significant since variations in rotor speed will cause variations in the size reduction of particles introduced thereinto. The high speed impact mill must further be adapted to tangentailly and radially accelerate particles of hydrogen storage alloy fed thereinto so as to achieve a velocity which will be sufficient to cause shattering of the particles along the natural fracture lines for comminution to a size within a preferred range of sizes, as disclosed therein. Particles introduced into the impact mill are accelerated and thrust upon the concentrically disposed impact block. The impact block is fabricated from tool steel or tungsten carbide.

After impact with the impact block, the comminuted hydrogen storage alloy material is reduced to a fine powder which is transported, e.g., by a stream of the non-reactive gas, from the impact block to a classifying means.

The comminuted alloy, recovered from the high speed impact mill is then size classified. Size classification is represented by block 71 of the FIGURE. The size classification is carried out in a stream of substantially non-reactive gas. In this step the oversized particles of comminuted powder are separated from particles having a particle distribution below at least 200 mesh size, and averaging about 400 mesh (38 micron).

The classifying means preferably includes at least means for the separating substantially non-reactive carrier gas from the hydrogen storage alloy powder so that the substantially non-reactive gas is recirculated for subsequent use within the closed system. The hydrogen storage alloy powder is discharged into a vibratory screen classifier adapted to selectively and separately isolate particles of less than 200 mesh size from those of greater than 200 mesh size. In so doing, the oversized particles are separately collected in a first collection drum, while those with less than 200 mesh size are collected in a separate second collection drum. The particle size distribution of the preferred hydrogen storage alloy powder is substantially all below 200 mesh size, and the material has an average particle size of about 400 mesh size.

The hydrogen storage alloy particulate fines are then metallurgically bonded to a substrate, i.e., a current collector, to form a negative electrode. This step is represented by block 81 of the FIGURE. In this step, described in our commonly assigned, copending, U.S. patent application Ser. No. 07/308,289, filed Feb. 9, 1989, in the names of Merle Wolff, Mark A. Nuss, Michael A. Fetcenko, Andrea L. Lijoi, Steven P. Sumner, Joseph LaRocca, and Thomas Kaatz, for IMPROVED METHOD FOR THE CONTINUOUS FABRICATION OF COMMINUTED HYDROGEN STORAGE ALLOY MATERIAL NEGATIVE ELECTRODE, and incorporated herein by reference, a layer of the powdered hydrogen storage alloy material is disposed, in an inert environment, substantially in contact with a wire mesh screen current collector substrate. The hydrogen storage alloy material and the wire mesh screen current collector substrate are subjected to at least one compaction process, so as to incorporate the powdered hydrogen storage alloy material into the wire mesh screen current collector.

The current collector may be nickel mesh or nickel plated steel mesh. The wire mesh screen is directed to the contact point by a series of steering devices adapted to prevent the mesh from wandering or "walking" thereby causing non-uniformities in the electrode web. Additionally, the active powder material should be kept in an inert, e.g., argon, environment so as to avoid exposure to oxygen and water. Wire mesh as used herein includes perforate or foraminous plate.

The wire mesh screen and powdered hydrogen storage alloy are next compacted in at least one and preferably two or more roll mill compactions of at least 16 tons per inch of width. After being exposed to the roll mill compaction processes, the powdered hydrogen storage alloy material becomes an integral part of the wire mesh screen, both of which are then trimmed and exposed to a preheating process and a high temperature, argon or argon-hydrogen atmosphere, sintering process.

This preheating and sintering step is carried out after compaction. The preheating process liberates excess moisture in the comminuted hydrogen storage alloy materials, and reduces the rate or even eliminates oxidation of the active materials contained therein. The preheat process takes place at temperatures sufficiently high to drive off excess moisture and to avoid oxidation in the wire mesh screen and the hydrogen storage alloy material. Sintering is carried out in a high temperature, substantially inert atmosphere, containing hydrogen, e.g., about 5 volumetric percent hydrogen.

Sintering bonds the particles together. The sintering process is carried out at temperatures sufficiently high to promote particle-to-particle bonding and bonding of the powder to the current collector. Subsequently, a partial hydrogen charge is applied to the electrode material. This partial charge is accomplished by exposure of the electrode to controlled amounts of hydrogen during cooling of the electrode.

As used herein, mesh screen size refers to U.S. standard mesh, wherein, for example, 200 U.S. mesh screen has interstices of about 75 microns, and 400 U.S. mesh screen has interstices of about 38 microns. Also, the term "natural fracture lines" refers to preexisting cracks and fissures present in the particulate metal hydride, hydrogen storage material, which cracks and fissures are generated, and partially propogated, in a previous hydride-dehydride comminution process.

The invention can be best understood through the examples presented hereinbelow.

EXAMPLES

Example I

A commercial alloy containing 85 weight percent vanadium, 7 weight percent aluminum, and 0.2 weight percent oxygen was electron beam distilled. Electron beam distillation of a several hundred pound sample was carried out in a vacuum chamber, with a vacuum of below $10^{-4}$ Torr, applying power until the feed material was completely molten.

The resultant vanadium rich alloy was analyzed to contain 1.4 weight percent aluminum after processing.

Example II

The alloy of Example I, above, was melted with titanium, chromium, nickel, and aluminum to form a hydrogen storage alloy. Melting was carried out as described hereinbelow, to form a composition of $V_{50.5}Ti_{18.2}Cr_{15.8}Ni_{13.9}Al_{1.6}$ (atomic percent).

This alloy was tested in a 30 percent aqueous solution of potassium hydroxide, and found to have an electrochemical hydrogen storage capacity of 320 milliampere hours per gram.

Example III

An alloy of 93 weight percent vanadium, and 7 weight percent aluminum (nominal) was prepared.
The resulting alloy contained:

| Vanadium | 94 weight percent |
| --- | --- |
| Aluminum | 5.7 weight percent |
| Silicon | 0.3 weight percent |
| Iron | 0.4 weight percent |
| Oxygen | 0.85 weight percent |
| Carbon | 0.05 weight percent |

This alloy was melted with titanium, chromium, nickel, and aluminum to make an alloy having the composition:

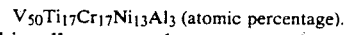
$V_{50}Ti_{17}Cr_{17}Ni_{13}Al_3$ (atomic percentage).

This alloy was then tested electrochemically and found to have an electrochemical hydrogen storage capacity of 280 milliampere hours per gram.

Example IV

The nominal 93 weight percent vanadium, 7 weight percent aluminum alloy was electron beam distilled as described in Example I, hereinabove. After electron beam distillation the alloy was found to have an aluminum content of 0.3 weight percent aluminum.

Example V

This example illustrates one embodiment of the method of the invention. In this example $V_2O_5$ was first reduced to elemental vanadium by aluminothermic reduction in a $V_2O_5$, nickel, aluminum containing first melt. The product of this first melt had the following composition:

| Vanadium | 64.3 weight percent |
| --- | --- |
| nickel | 34.7 weight percent |
| Aluminum | 0.03 weight percent |
| Oxygen | 0.46 weight percent |

This product was then alloyed with other alloying agents in a second melt. The alloy produced in the second melt was then comminuted by a hydride-dehydride process, and subsequent milling to produce minus 100 mesh fines. These fines were then metallurgically bonded to a nickel mesh current collector substrate to form a negative electrode for use in a rechargeable electrochemical cell.

Each of the raw materials necessary for the fabrication of the metal hydride negative electrode material was carefully weight to within + or −0.05 kilograms. Each component was weight out in the following proportions.

| Nickel shot | 8.41 KG |
| --- | --- |
| Vanadium-Nickel | 8.55 KG |
| Chromium | 1.68 KG |
| Titanium | 3.92 KG |
| Zirconium | 7.45 KG |

| -continued | |
|---|---|
| Total | 30.00 KG |

The vanadium-nickel alloy had been prepared by the aluminothermic reduction of vanadium oxide by aluminum and nickel. The zirconium and vanadium-nickel were placed into the melting crucible, filling it approximately to the top. The melting crucible was a high density, high purity graphite crucible fabricated from graphite such as that provided by Stackpole Inc., Carbon Division, Graphite Grade 2020; or Union Carbide Corporation, Carbon Products Division, GRAPHI-TOOL TM Graphite Materials.

The vanadium-nickel, which was first separated into two grades, fine powder and coarse rocks, was placed into the graphite crucible. Loose zirconium was prepared by pressing the material into a six inch diameter by six inch high pellet. This zirconium pellet represents approximately 60 percent of the total amount of zirconium used in the melt. The remaining 40 percent was loaded in loose form, i.e., powder in the melting crucible. The zirconium pellet was first loaded into the crucible along with the vanadium nickel material, with the vanadium nickel being placed around the zirconium pellet. Some of the loose, powdered zirconium was also mixed with the vanadium nickel and pressed around the pellet. Additional pellets of zirconium may be stacked atop the initial zirconium pellet in order to completely fill the high density, high purity graphite crucible.

The course of vanadium nickel was disposed so as to fill the graphite crucible to the rim. The vanadium nickel remained loosely packed to insure that bridging did not occur during the initial melt. Additionally, a small amount of titanium was used to block the front of the crucible so that a slight tilt was applied thereto so that bridging did not occur during the initial melt procedure.

Thereafter, approximately four cups of nickel shot was mixed with approximately two cups of chromium. The nickel, chromium mixture was then placed into an addition/loading chamber. The top of the loading chamber was made secure so that an argon blanket could be disposed thereover. Thereafter, the furnace was sealed and evacuated to a pressure of less than about 200 microns and backfilled with argon to a pressure of about 100 microns. This procedure was repeated three times.

After the third evacuation, the background pressure of the furnace was less than 50 microns. A preheat regimen was then started so as to begin to cycle the furnace to the appropriate temperature in order to thoroughly melt the material disposed in the graphite crucible. After having appropriately evacuated the chamber, power was applied to the furnace so as to begin heating it to the desired temperature. Measurements were taken approximately every 10 minutes to determine the atmosphere inside of the chamber. After approximately 30 minutes, the chamber background pressure had risen to approximately 150 microns. Thus after the preheat was completed, the chamber was re-evacuated to a background pressure of about 50 microns.

At the beginning of the heating process, the power applied, to the vacuum induction melt furnace was ramped up from 25 kilowatts applied power to approximately 55 kilowatts applied power. After achieving 55 kilowatts of power during the first approximately 25 minutes, the chamber was allowed to idle at approximately 55 kilowatts for about 10 minutes, at which time a portion of the nickel, chromium mixture in the addition/loading chamber was added. After adding the nickel and chromium, the power level was allowed to remain at 55 kilowatts for about 5 to 10 minutes at which time the remainder of the nickel, chromium mixture was added. The addition chamber was then resealed and brought back to atmospheric pressure so as to open it to ambient conditions from the outside of the furnace. Approximately six cups of titanium was added to and packed firmly into the interior of the addition chamber. Thereafter, the addition chamber was resealed and a vacuum level established which was substantially identical to that within the furnace, i.e., approximately 50 microns. The titanium was added to the melt within the furnace approximately 5 to 10 minutes after the addition of the nickel, chromium mixture. The furnace was allowed to continue at approximately 55 kilowatts of power for 10 minutes as the addition chamber was reloaded using the above described procedure with the remaining titanium. This remaining titanium was added to the melt approximately 10 minutes after the second reload.

Thereafter, applied power was ramped up from 55 kilowatts to approximately 75 kilowatts during the course of approximately 10 minutes. The temperature at this point was generally between 1300° and 1400° Celsius. The power level was set at 75 kilowatts for about 15 minutes. During this time a white slag film was observed, although it was further observed to dissipate during this 10 minute span. The 10 to 15 minutes at 75 kilowatts increased the temperature of the melt to approximately 1600° Celsius. Thereafter, approximately 85 kilowatts of power was applied to the furnace taking the temperature of the melt to approximately 1800° C. This power level was maintained for approximately 10 minutes after which the applied power was reduced to 40 kilowatts so as to maintain a temperature of approximately 1750° Centigrade. As the temperature cooled down to below approximately 1750°, the white slag film was observed reforming. This typically has been observed to take about 10 minutes. After the film has formed covering the entire surface of the melt, approximately two minutes time was allowed after which the operator of the chamber turned off the power applied to the furnace. Thereafter, a small amount of the melted alloy material was poured off from the crucible and into a water cooled, second high density, high purity, graphite crucible. This initial pouring was adapted to coat the interior of the cooling crucible. After having poured off the initial amount of the melt, and having waited for approximately one to two minutes, the remainder of the melt was poured from the furnace, into the water cooled graphite crucible. It has been observed that it takes approximately four hours for the melt to solidify in the water cooled graphite cooling crucible. After cooling, the ingot so formed was ready for a hydriding comminution as described in the hereinabove incorporated patents and patent applications.

Example VI

Employing the fabrication steps enumerated in Example V, a metal hydride hydrogen storage alloy material having the nominal composition $V_{53}Ti_{17}Cr_{16}Ni_{14}$ was fabricated from an aluminothermically produced V-Ni alloy. The raw materials necessary for fabricating the material were carefully weighed out to within $+/-0.05$ kilograms, the following proportions:

| | |
|---|---|
| Vanadium Turnings | 6.785 KG |
| Vanadium-Nickel | 13.563 KG |
| Titanium | 4.623 KG |
| Chromium | 5.016 KG |
| Total | 30.00 KG |

As in Example V, vanadium nickel and vanadium turnings were placed into the melting crucible, filling the crucible approximately to the top, and melting was carried out as described in Example V, hereinabove. After a slag film formed, covering the entire surface of the melt, approximately, a small amount of the melt was poured off into the water cooled, second, high density, high purity, graphite crucible. This initial pouring was adapted to coat the interior of the cooling crucible. After pouring off the initial amount of the melt, and waiting for approximately one to two minutes, the remainder of the melt was poured from the furnace into the water cooled graphite crucible, and allowed to cool and solidify. After cooling, the ingot so formed was ready for a hydriding comminution as described in the hereinabove incorporated patents and patent applications.

EXAMPLE VII

Alloys of (1) 93 weight percent vanadium and 7 weight percent aluminum, and (2) 65 weight percent vanadium and 35 weight percent nickel were prepared. These alloys were melted with vanadium turnings, nickel, titanium, and chromium in the following quantities:

| | |
|---|---|
| V-Ni (65:35) | 6.61 KG |
| V-Al (93:7) | 4.60 KG |
| Vanadium turnings | 4.05 KG |
| Nickel | 1.38 KG |
| Titanium | 3.83 KG |
| Chromium | 4.16 KG |

The resulting electrochemical hydrogen storage alloy had the composition $V_{50}Ti_{17}Cr_{17}Ni_{13}Al_3$.

EXAMPLE VIII

Alloys of (1) 93 weight percent vanadium and 7 weight percent aluminum, and (2) 65 weight percent vanadium and 35 weight percent nickel were prepared. These alloys were melted with vanadium turnings, nickel, titanium, and chromium in the following quantities:

| | |
|---|---|
| V-Ni (65:35) | 7.18 KG |
| V-Al (93:7) | 13.35 KG |
| Titanium | 4.55 KG |
| Chromium | 4.93 KG |

The resulting electrochemical hydrogen storage alloy had the composition $V_{49}Ti_{16}Cr_{16}Ni_{12}Al_7$.

While the invention has been described in connection with preferred embodiments and procedures, it was to be understood that it was not intended to limit the invention to the described embodiments and procedures. On the contrary, it was intended to cover all alternatives, modifications and equivalence may be included within the spirit and scope of the invention as defined by the claims appended herein and after.

I claim:

1. In a method of forming a multi-component reversible hydrogen storage alloy, which alloy comprises vanadium and at least a second metal, said method comprising the steps of forming a melt of the components and solidifying the melt to form the multi-component alloy, the improvement comprising:
   (a) providing a first composition of vanadium and aluminum, having less than 20 weight percent aluminum; said first composition formed by providing a precursor of vanadium oxide and aluminum, wherein the aluminum content in the vanadium oxide-aluminum precursor is substantially stoichiometric to minimize the aluminum and oxygen content of the first composition;
   (b) forming a second composition comprising the first composition and said at least second metal, said second metal selected from the group consisting of titanium, hafnium, niobium, zirconium, chromium, nickel and combinations thereof; and
   (c) solidifying the second composition to form the multi-component hydrogen storage alloy.

2. The method of claim 1 wherein the multi-component hydrogen storage alloy is an alloy chosen from the group consisting of:
   (a) titanium-vanadium-nickel-aluminum alloys;
   (b) titanium-vanadium-nickel-zirconium alloys;
   (c) titanium-vanadium-chromium-nickel alloys;
   (d) titanium-ziroconium-vanadium-nickel-chromium alloys; and
   (e) titanium-vanadium-manganese-iron alloys.

3. The method of claim 1 wherein the multi-component hydrogen storage alloy is an alloy chosen from the group consisting of:
   (1) titanuim-vanadium-nickel-aluminum alloys having the formula $(TiV_{2-x}Ni_x)_{1-y}Al_y$, where x is from 0.2 to 1.0, and y is from 0 to 0.2;
   (2) titanium-vanadium-nickel-zirconium alloys having the formula $(TiV_{2-x}Ni_x)_{1-y}Zr_y$, where x is from 0.2 to 1.0, and y is from 0 to 0.2;
   (3). titanium-vanadium-chromium-nickel alloys having the formula $Ti_{1-x}V_{2-y}Cr_xNi_y$, where x is from 0.0 to 0.75, and y is from 0.2 to 1.0;
   (4) titanium-zirconium-vanadium-nickel-chromium alloys having the formula $(Ti_{2-x}Zr_xV_{4-y}Ni_y)_{1-z}Cr_z$, where x is from 0.00 to 1.5, y is from 0.6 to 1.5, and z is from 0.0 to 0.2; and
   (5) titanium-vanadium-manganese-iron alloys having the formula $Ti_aV_bMn_cFe_d$ where a is from 0.5 to 0.75, b is from 1.15 to 1.65, (a+c) is from 0.9 to 1.3, and (b+d) is from 1.6 to 2.0.

4. The method of claim 1 comprising:
   (a) electron beam distilling aluminum from the first composition to provide a vanadium composition reduced in aluminum content;
   (b) forming a second composition comprising the first composition, reduced in aluminum content, and the second metal; and
   (c) solidifying the second composition to form the multi-component hydrogen storage alloy.

5. The method of claim 1 comprising:
   (a) forming the first composition of vanadium and aluminum by:
      (i) providing a composition of vanadium oxide, and aluminum;
      (ii) heating the composition, to initiate an aluminothermic reduction reaction between the vanadium oxide and the aluminum and to form a multi-phase system comprising: (1) a metallic phase comprising vanadium and aluminum and;
(2) an aluminum-oxygen slag phase;
(iii) recovering the metallic phase material;
(b) forming a second composition comprising the titanium-zirconium-vanadium-nickel-chromium and said at least second metal; and
(c) solidifying the second composition to form the multi-component hydrogen storage alloy.

6. The method of claim 1 wherein said alloy comprises at least about 33 atomic percent vanadium.

7. The method of claim 1 wherein said first composition material contains less than about 0.8 weight percent oxygen.

8. The method of claim 1 wherein said first composition material contains about 0.2 weight percent oxygen.

9. The method of claim 1 comprising:
(a) forming the first composition of vanadium and aluminum by:
(i). providing a composition of vanadium oxide, aluminum, and nickel;
(ii). heating the composition, to initiate an aluminothermic reduction reaction between the vanadium oxide, the aluminum and the nickel to form a multi-phase system comprising: (1) a metallic phase comprising vanadium, nickel, and aluminum and; (2) an aluminum-oxygen slag phase;
(iii). recovering the metallic phase material;
(b) forming a second composition comprising the vanadium-nickel-aluminum metallic phase material and at least a third metal; and
(c) solidifying the second composition to form the multi-component hydrogen storage alloy.

10. The method of claim 4 comprising providing a vanadium alloy containing at least 15 weight percent aluminum, and electron beam distilling the vanadium aluminum alloy to form a first composition, reduced in aluminum content.

11. The method of claim 7 wherein said first composition contains at least 7 weight percent aluminum.

12. The method of claim 8 wherein said first composition contains 15 weight percent aluminum.

13. The method of claim 9 wherein nickel is present in the vanadium oxide composition at a level sufficient to result in the metallic phase less than about 0.4 weight percent oxygen.

14. The method of claim 9 wherein nickel is present in the vanadium oxide composition at a level sufficient to result in the metallic phase being substantially free of oxygen.

15. The method of claim 9 wherein said metallic phase contains aluminum.

16. The method of claim 9 wherein said metallic phase is substantially free of aluminum.

17. The method of claim 9 wherein said metallic phase contains less than 0.5 weight percent aluminum.

18. The method of claim 9 wherein said metallic phase material comprises at least about 35 weight percent nickel.

19. The method of claim 10 wherein the first composition, reduced in aluminum content, contains less than about 1.5 weight percent aluminum.

20. The method of claim 10 comprising providing a vanadium alloy containing at least 7 weight percent aluminum, and electron beam distilling the vanadium aluminum alloy to form a first composition, reduced in aluminum content.

21. The method of claim 20 wherein the first composition, reduced in aluminum content, contains less than about 0.5 weight percent aluminum.

22. In a method of forming a multi-component reversible, hydrogen storage alloy, which alloy comprises vanadium, said method comprising the steps of forming a melt of the components and solidifying the melt to form the multi-component alloy, the improvement comprising:
(a) providing a first composition consisting essentially of vanadium and at least about seven weight percent aluminum;
(b) electron beam distilling aluminum from the first composition to provide a vanadium composition reduced in aluminum content;
(c) forming a second composition comprising the first composition reduced in aluminum content, and at least one of titanium, niobium, hafnium, zirconium, chromium, and nickel; and
(d) solidifying the second composition to form the multi-component hydrogen storage alloy.

23. In a method of forming a multi-component reversible, hydrogen storage alloy, which alloy comprises vanadium, said method comprising the steps of forming a melt of the components and solidifying the melt to form the multi-component alloy, the improvement comprising:
(a) providing a composition of vanadium oxide, and aluminum;
(b) heating the composition, to initiate an aluminothermic reduction reaction between the vanadium oxide and the aluminum, and to form a multi-phase system comprising:
(1) a metallic phase comprising vanadium and aluminum and;
(2) an aluminum-oxygen slag phase;
(c) recovering the metallic phase material;
(d) forming a second composition comprising the vanadium-aluminum metallic phase material and at least a second metal; and
(e) solidifying the second composition to form the multi-component hydrogen storage alloy.

24. The method of claim 22 wherein said metallic phase material contains less than about 0.8 weight percent oxygen.

25. The method of claim 22 wherein said metallic phase material contains less than about 7 weight percent aluminum.

26. The method of claim 22 wherein nickel is present in the vanadium oxide composition at a level sufficient to result in the metallic phase less than about 0.9 atomic percent oxygen.

27. The method of claim 23 wherein said alloy comprises at least about 33 weight percent vanadium.

28. The the method of claim 26 wherein the metallic phase is substantially free of oxygen.

29. The method of claim 28 wherein said metallic phase is substantially free of aluminum.

30. The method of claim 28 wherein said metallic phase contains less than about 0.5 weight percent aluminum.

31. In a method of forming a multi-component reversible hydrogen storage alloy, which alloy comprises vanadium, nickel, and at least a third metal, which method comprises the steps of forming a melt of the components and solidifying the melt to form the multi-component alloy, the improvement comprising:

(a) providing a composition of vanadium oxide, nickel, and aluminum;
(b) heating the composition, to initiate an aluminothermic reduction reaction between the vanadium oxide, the nickel, and the aluminum and to form a multi-phase system comprising:
 (1) a metallic phase comprising vanadium, nickel, and aluminum and;
 (2) an aluminum-oxygen phase;
(c) recovering the metallic phase material;
(d) forming a second composition comprising the vanadium-nickel-aluminum metallic phase material and the said third metal; and
(e) solidifying the second composition to form the multi-component hydrogen storage alloy.

32. The method of claim 31 wherein said alloy comprises at least about 33 atomic percent vanadium.

33. The method of claim 31 wherein said metallic phase material contains less than about 0.4 atomic percent oxygen.

34. The method of claim 31 wherein said metallic phase material contains less than about 0.5 weight percent aluminum.

35. The method of claim 31 wherein the nickel is present in the vanadium oxide composition at a level sufficient to result in the metallic phase being substantially free of oxygen.

36. The method of claim 31 wherein said metallic phase is substantially free of aluminum.

37. In a method of forming a multi-component reversible hydrogen storage alloy, which alloy comprises a refractory forming metal chosen from the group consisting of vanadium, zirconium, hafnium, niobium, and mixtures thereof, and at least a second metal, said method comprising the steps of forming a melt of the components and solidifying the melt to form the multi-component alloy, the improvement comprising:
(a) providing a first composition of the said refractory forming metal and aluminum;
(b) forming a second composition comprising the first composition and said at least second metal; and
(c) solidifying the second composition to form the multi-component hydrogen storage alloy.

38. The method of claim 37 comprising:
(a) electron beam distilling aluminum from the first composition to provide a metallic composition reduced in aluminum content;
(b) forming a second composition comprising the first composition, reduced in aluminum content, and the second metal; and
(c) solidifying the second composition to form the multi-component hydrogen storage alloy.

39. The method of claim 37 comprising:
(a) forming the first composition of the refractory forming metal and aluminum by:
 (i). providing a composition of an oxide of the refractory forming metal, and aluminum;
 (ii). heating the composition, to initiate an aluminothermic reduction reaction between the oxide of the refractory forming metal and the aluminum and to form a multi-phase system comprising:
  (1) a metallic phase comprising the refractory forming metal and aluminum and; (2) an aluminum-oxygen phase;
 (iii). recovering the metallic phase material;
(b) forming a second composition comprising the refractory forming metal-aluminum metallic phase material and said at least second metal; and
(c) solidifying the second composition to form the multi-component hydrogen storage alloy.

40. The method of claim 37 comprising:
(a) forming the first composition of the refractory forming metal and aluminum by:
 (i). providing a composition of an oxide of the refractory forming metal, aluminum, and nickel;
 (ii). heating the composition, to initiate an aluminothermic reduction reaction between the oxide of the refractory forming metal, the aluminum and to form a multi-phase system comprising:
  (1) a metallic phase comprising the refractory forming metal, nickel, and aluminum and; (2) an aluminum-oxygen phase;
 (iii). recovering the metallic phase material;
(b) forming a second composition comprising the refractory forming metal-nickel-aluminum metallic phase material and at least a third metal; and
(c) solidifying the second composition to form the multi-component hydrogen storage alloy.

* * * * *